Oct. 4, 1938. H. C. RICHARDS 2,132,346

INTERCONVERTIBLE GOGGLE AND EYESHADE

Filed Jan. 27, 1937

INVENTOR
Harry C. Richards.
BY
ATTORNEY

Patented Oct. 4, 1938

2,132,346

UNITED STATES PATENT OFFICE 2,132,346

INTERCONVERTIBLE GOGGLE AND EYE-SHADE

Harry C. Richards, North Arlington, N. J., assignor to Fosgood Corporation, Leominster, Mass., a corporation of Massachusetts Application January 27, 1937, Serial No. 122,489

4 Claims. (Cl. 88—41)

The present invention relates to an interconvertible goggle and eyeshade; or, more specifically, to a device convertible in use from any eye piece whereby to obtain subdued or colored lighting, to an eyeshade, and vice versa.

An object of the invention is a device, of the character mentioned, comprising a frame on which are mounted a pair of colored glasses, which, in the use of the device for sighting in subdued or colored light, stand in a vertical plane, but which may be swung upward and outward from such plane into a plane at an angle thereto to serve as dark or colored vizor-like shades above the eyes.

Further objects of the invention are means whereby the above mentioned frame with its colored glass pieces may as a unit be attached to and removed from any ordinary eyeglasses by a simple spring or snap action; and whereby the colored glass pieces may be held, preferably by friction, in any desired angular setting forward of the lenses of the eyeglasses.

Other objects and features of the invention will more fully appear upon reference to the accompanying drawing, in which.

Figure 1:
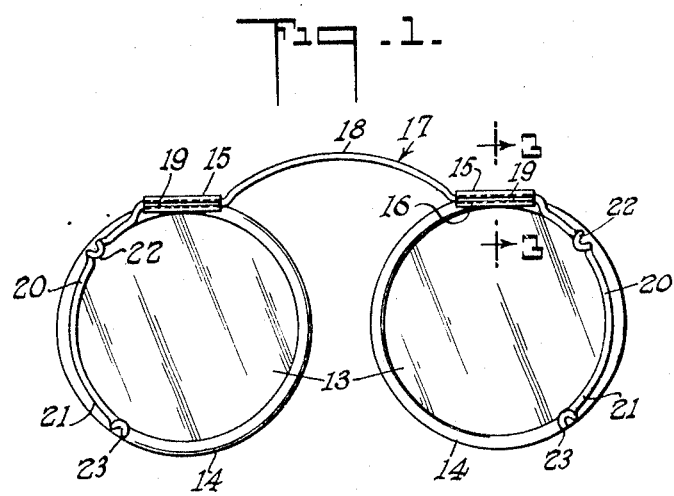
Figure 1 shows the device in elevation, viewed from the rear; the colored glass pieces being in vertical or sighting position.
Figure 2:
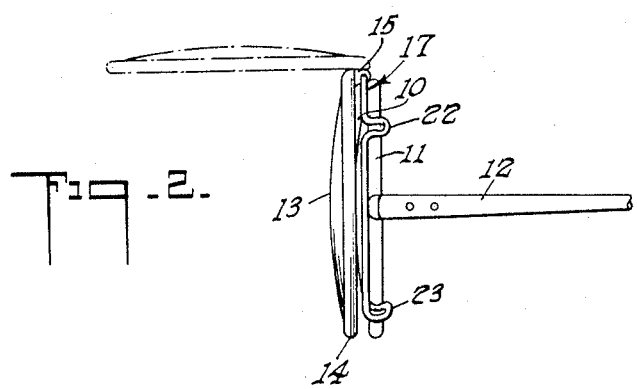
Fig. 2 is a view in end elevation, the colored glass pieces being shown in full lines in sighting position, and in dotted lines in eye-shading position.

Referring to the drawing, and particularly to Fig. 2, there is shown a pair of eyeglasses having lenses 10 mounted in rims 11 to which are attached temples 12, all of any common style. The device of the present invention is shown as mounted on the eyeglass rims 11, with the colored glass pieces 13 thereof in front of the eyeglass lenses 10.

The colored glass pieces 13 of the device are mounted in rims 14, and each of the rims 14 at the upper central part thereof has a lug 15, unitary therewith, and offset rearward therefrom. Each of the lugs 15 has a passage 16 extending longitudinally therethrough, the passages 16 and the two lugs being in alignment.

The frame of the device consists of a single wire 17. This wire is bowed upward at 18 centrally thereof, and at each end of the bow is turned longitudinaly into two aligned reaches 19 which lie in the lug passages 16 and serve as bearings for the colored eye pieces on the wire frame 17.

From the lugs 15 the wire of the frame is curved downward at 20 in the general contour of the rims 11 of the eyeglass lenses to be embraced thereby. The ends of the wire 17 follow this contour a distance below the center of the lenses, so as to be turned in toward each other, as at 21, to interlock with the eyeglass rims against relative vertical displacement.

The wire in the part 20 at each side of the frame has a bend 22 offset rearward, and at its ends in the parts 21 has a similar bend 23 offset rearward. These bends 22 and 23 themselves are bent laterally inward and toward the center of the lenses to provide seats for the device upon the rims 11 of the eyeglasses and to lock the device to the eyeglasses.

The wire of the frame 17 is a spring wire, and hence has only to be spread against its spring action to permit the detents or catches 22 and 23 to be snapped over the rims 11 of the eyeglasses. When thus positioned upon the eyeglass rims, the spring action of the frame holds the catches in the position in which the device is locked to the eyeglasses. To remove the device, the spring frame 17 is spread in the same manner as in the application of the device to the eyeglasses.

Figure 3:
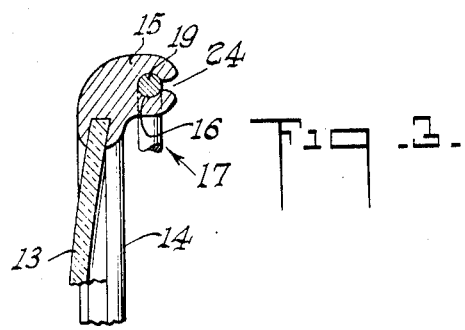
Fig. 3 is an enlarged view in cross section showing in detail the mounting of the colored eye pieces on the wire frame of the device.

The wire of the reaches 19 of the frame 17 has frictional contact with the walls of the passages 16 in the lugs 15 so that in whatever angular position the eye pieces may be set, they will be retained frictionally in such position. As more particularly shown in Fig. 3, the passages 16 in the lugs 15 are open at 24 at the rear of the lugs so that the wire may be pushed laterally forward into the bearing passages 16 therefor. When the wire has been pushed forward into home position in the passages 16, the lugs 15 may be slightly pinched at the rear edge thereof to contract the openings 24 and prevent disconnection of the colored glass pieces from the frame therefor.

In Fig. 2 the eye pieces are shown in full lines in the vertical or sighting position, that is to say, in the position in which objects are seen through the eyeglasses in a subdued or colored light. In the dotted position of the colored eye pieces, see Fig. 2, the colored eye pieces have been swung upward and outward and are frictionally held to serve as shades for the eyes.

The rims 14 of the colored glass pieces 13, together with the lugs 15, are preferably made of a plastic composition, such as a cellulose acetate composition, or like material, although they may be made of metal or other substance.

What I claim is:—

1. In an auxiliary glare shield attachment for eyeglasses, a wire frame formed to provide a curved central portion and oppositely extending horiozntal reach portions projecting outwardly from each end of said curved portion, a glare shield for each eyeglass including a rim having a pair of centrally located and vertically spaced lugs extending rearwardly therefrom to receive and frictionally grip a horizontal reach portion of the frame therebetween, and means formed on the wire frame for connecting the latter and thereby the glare shield to the eyeglasses.

2. In an auxiliary glare shield attachment for eyeglasses, a wire frame formed to provide a curved central portion and oppositely extending horizontal reach portions projecting outwardly from each end of said curved portion, a glare shield for each eyeglass including a rim of thermoplastic material having a pair of centrally located and vertically spaced lugs extending rearwardly therefrom, the space between the lugs being less than the thickness of the reach portions so as to frictionally grip the latter, and means formed on the wire frame for connecting the latter and thereby the glare shield to the eyeglasses.

3. An auxiliary glare shield for use with eyeglasses, comprising a continuous wire body bent to provide a centrally located upwardly curved bight portion, a horizontally extending reach portion projecting outwardly from each end of the bight portion, and downwardly and inwardly curved free end portions, a glare shield connected to each of said reach portions comprising a rim formed of thermo-plastic material having a pair of centrally located and vertically spaced lugs extending rearwardly therefrom, the space between the lugs being less than the thickness of the reach portions so as to frictionally grip the latter, and connecting means formed on the downwardly and inwardly curved free end portions, whereby to connect the wire frame and its attached glare shields to a pair of eyeglasses.

4. An auxiliary glare shield for use with a pair of eyeglasses, including a continuous wire frame, means for connecting said frame to a pair of eyeglasses, and a pair of spaced glare shields connected to the frame, each of said shields including a rim having a pair of rearwardly projecting spaced lugs connected thereto and vertically spaced to receive a portion of said frame therebetween, the width of the space between the lugs being less than the portion of the frame with which said lugs engage, whereby said glare shields may be swung into various adjusted positions toward or away from the plane of the eyeglasses and be held in such positions solely by frictional engagement of the lugs with the frame.

HARRY C. RICHARDS.